United States Patent
Oi et al.

(10) Patent No.: US 6,417,307 B1
(45) Date of Patent: Jul. 9, 2002

(54) SHRINK FILM

(75) Inventors: Nobuo Oi, Narashino; Hayato Kihara, Chiba; Tatsuya Miyatake, Ichihara, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/514,303

(22) Filed: Feb. 28, 2000

(30) Foreign Application Priority Data

Mar. 1, 1999 (JP) .......................................... 11-052502

(51) Int. Cl.[7] .............................................. C08F 212/06
(52) U.S. Cl. ........................ 526/347; 526/160; 526/161; 502/152; 502/155
(58) Field of Search ................................ 526/160, 161, 526/348.6, 347, 347.1; 502/152, 155

(56) References Cited

FOREIGN PATENT DOCUMENTS

| EP | 0764653 A2 | | 8/1990 |
| EP | 0 764 653 A2 | * | 3/1997 |
| EP | 0930329 A1 | | 7/1999 |
| JP | 9309925 A | | 12/1997 |
| JP | 1060051 A | | 3/1998 |
| WO | 9809999 A2 | | 3/1998 |
| WO | WO-98/09999 | * | 3/1998 |

* cited by examiner

*Primary Examiner*—David W. Wu
*Assistant Examiner*—R. Harlan
(74) *Attorney, Agent, or Firm*—Birch, Stewart, Kolasch & Birch, LLP (57) ABSTRACT

A shrink film comprising a non-crystalline copolymer of ethylene with an alkenyl aromatic hydrocarbon, and having a transparency, a low temperature shrinking property, a high shrinkage ratio and a small natural shrinkage.

8 Claims, 1 Drawing Sheet

Fig.1

SHRINK FILM

BACKGROUND OF THE INVENTION

1. Field of the Invention

The present invention relates to a shrink film comprising a non-crystalline ethylene-alkenyl aromatic hydrocarbon copolymer.

2. Description of the Related Arts

As labels for plastic or glass containers, shrink films which are easily torn off from the containers, have been frequently used due to scrapping after used or recycled. As a raw material resin for the shrink film, a polyvinyl chloride resin, styrene-butadiene block copolymer resin, polyethylene terephthalate(PET) resin, polyolefin resin or the like has been used. Particularly, it is required that the shrink film has a low temperature shrinking property, which is capable of shrink-wrapping at a temperature of 100° C. or lower, preferably round 80° C. from a viewpoint of protection of the contents. When the degree of shrinking at normal temperature(herein-after, referred to as "natural shrinkage") of the shrink film is large, there are problems that the film can not be applied to a shrinking machine or the printed pattern thereon is deformed because of the natural shrinkage during a storage of the film, and the commercial value is lost. Therefore, a film of a small natural shrinkage is required.

A polyvinyl chloride resin has been much used for use of shrink film because of small natural shrinkage and good low temperature shrinking property. However, from a recent upsurge of environmental consciousness, a change to non-chlorine polymer materials for one-way containers, has been required. As the non-chlorine polymer, a styrene-butadiene block copolymer or a polyethylene terephthalate resin has been used. However, the natural shrinkage is large because the styrene-butadiene block copolymer has a glass transition point below 0° C., and therefore the cold storage in summer time is necessary. Accordingly, there is a problem in industrial. On the other hand, when the bottle is made of the polyethylene terephthalate resin (called as "PET bottle"), the separation into the bottle(plain) and the label (printed) is required for recycling. But, the separation is difficult or a special separation machine is necessary because the specific gravity thereof is the same each other. Therefore, this resin also has a problem in industrial.

Further, a shrink film of an olefin resin has been developed, but because the shrinkage ratio is small at a temperature during shrink-wrapping, for example, at 80° C. and the rigidity is low, the label can not be sufficiently adhered to a container. Therefore, there is also a problem such as reduction of the commercial value.

As mentioned above, although various resin have been used as the shrink film and studied for development, no film to be satisfied is actually obtained.

SUMMARY OF THE INVENTION

An object of the present invention is to provide a shrink film having a transparency, a low temperature shrinking property, a high shrinkage ratio, a small natural shrinkage, composed of a non-chlorine resin.

The present invention relates to a shrink film comprising a non-crystalline ethylene-alkenyl aromatic hydrocarbon copolymer.

DETAILED DESCRIPTION OF THE INVENTION

The present invention is illustrated in detail below.

The shrink film copolymer of the present invention is prepared by using a copolymer of ethylene with an alkenyl aromatic hydrocarbon.

Herein, as the alkenyl aromatic hydrocarbon, an alkenyl compound having an aromatic hydrocarbon group having 6 to 25 carbon atoms is preferable. Specific examples of the aromatic hydrocarbon group having 6 to 25 carbon atoms include a phenyl group, a tolyl group, a xylyl group, a tert-butylphenyl group, a vinylphenyl group, a naphthyl group, a phenanthryl group, an anthrathenyl group and the like. A phenyl group, a tolyl group, a xylyl group, a tert-butylphenyl group, a vinylphenyl group or a naphthyl group is preferable.

Specific examples of such alkenyl aromatic hydrocarbon include alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, p-sec-butylstyrene and the like; alkenylbenzenes such as, 2-phenylpropylene, 2-phenylbutene and the like; vinylnaphthalenes such as 1-vinylnaphthalene and the like, etc. As the alkenyl aromatic hydrocarbon used in the present invention, styrene, p-methylstyrene, m-methylstyrene, o-methylstyrene, p-tert-butylstyrene, 2-phenylpropylene or 1-vinylnaphthalene is preferable and styrene is preferable in particular.

In the copolymer of ethylene with an alkenyl aromatic hydrocarbon used in the present invention, sequences of ethylene and the alkenyl aromatic hydrocarbon in the copolymer chain can be respectively determined by a $^{13}$C-NMR spectrum.

Preferably, the copolymer has a structure in which carbon atoms substituted with an aromatic hydrocarbon group mutually separated by one methylene group, a structure in which carbon atoms substituted with an aromatic hydrocarbon group mutually separated by two methylene groups, and a structure in which carbon atoms substituted with an aromatic hydrocarbon group mutually separated three or more of methylene groups.

In this case, in the copolymer, the structure in which the carbon mutually separated by three or more of methylene groups, the structure in which the carbon mutually separated by two methylene groups, and the structure in which the carbon mutually separated by one methylene group, may be contained in one polymer chain or different polymer chains of the copolymer.

A copolymer having the structure in which the carbon substituted with the aromatic hydrocarbon group mutually separated by one methylene group, has alkenyl aromatic hydrocarbon sequences in which two alkenyl aromatic hydrocarbon units are bonded to the same direction, so-called head to tail. When such alkenyl aromatic hydrocarbon sequences exist, the signal of $^{13}$C-NMR spectrum corresponding to the carbon atom ($T_{\beta\delta}$) substituted with the aromatic hydrocarbon is usually observed at near 44.0 ppm.

In the $^{13}$C-NMR spectrum, the peak based on a methylene group indicated by $S_{\alpha\gamma}$ and $S_{\alpha\delta}$ in the general formula (1) described below appears usually at 36.0 to 38.0 ppm (③).

The existence of said methylene group represents that an alkenyl aromatic hydrocarbon unit is sandwiched by ethylene units and a structure in which there is no sequence of the alkenyl aromatic hydrocarbons exists. Further, when such bond occurs, carbon atoms substituted with an aromatic hydrocarbon group are mutually separated by 3 methylene groups or more.

Further, a peak based on a methylene group indicated by $S_{\alpha\beta}$ in the general formula (2) described below appears usually at 34.0 to 36.0 ppm (②). Such methylene group exists when the alkenyl aromatic hydrocarbon unit is bonded to an inverse direction in the molecular chains of the copolymer. In other words, said methylene group exists when the insertion form of the alkenyl aromatic hydrocarbon takes 2,1-insertion of the alkenyl aromatic hydrocarbon successively after 1,2-insertion, or takes 1,2-insertion through the insertion of ethylene after 2,1-insertion. Further, when such bond occurs, carbon atoms substituted with an aromatic hydrocarbon group are mutually separated by 2 methylene groups.

General Formula (1), $n \geq 2$

General Formula (2), $n = 1$

Further, a case in which styrene was used as the alkenyl aromatic hydrocarbon is illustrated in the general formulae (1) and (2).

The copolymer of the present invention is a copolymer having a ratio (②/③) of the area of a peak ② appearing at 34.0 to 36.0 ppm in a $^{13}$C-NMR spectrum of the copolymer to the area of a peak (③) appearing at 36.0 to 38.0 ppm of 0.01 to 0.35, preferably 0.01 to 0.25, more preferably 0.01 to 0.20.

The copolymer used in the present invention has no crystallinity. It is confirmed by not substantially showing the melting point in the fusion curve measured with a differential scanning calorimeter (DSC) that the copolymer is non-crystalline.

The copolymer used in the present invention preferably has a glass transition point (Tg) measured with a DSC of 25 to 100° C., more preferably 30 to 80° C.

It is preferable that the Tg of the copolymer is within the above range because the shrink film obtained therefrom is excellent in low temperature shrinking property and small in natural shrinkage.

In the ethylene-alkenyl aromatic hydrocarbon copolymer used the present invention, the content of the alkenyl aromatic hydrocarbon unit in the copolymer is 1 to 99 mol %, preferably 10 to 60 mol %, and more preferably 20 to 60 mol %.

It is preferable that the content of the alkenyl aromatic hydrocarbon unit in the copolymer is within the above range because of providing a shrink film in which the natural shrinkage is particularly small.

The density of the copolymer is usually 0.9 to 1.1 g/cm$^3$, and is markedly lower than that of a polyethylene terephthalate resin(1.33–1.52g/cm3).

The number average molecular weight (Mn) of the copolymer is not limited as far as the shrink film can be obtained, and is preferably 10000 to 1000000, more preferably 50000 to 300000.

The copolymer above described can be produced, for example, by copolymerizing ethylene with an alkenyl aromatic hydrocarbon in the presence of a catalyst prepared by using (A) and (B), (A) and (C), or (A),(B) and (C) described below:

(A): a transition metal complex represented by the following general formula [I]:

(wherein M$^1$ represents a transition metal atom of Group IV of the Periodic Table of the Elements; A represents an atom of the Group XVI of the Periodic Table of the Elements; J represents an atom of the Group XIV of the Periodic Table of the Elements; Cp$^1$ represents a group having a cyclopentadiene type anion skeleton; X$^1$, X$^2$, R$^1$, R$^2$, R$^3$, R$^4$, R$^5$ and R$^6$ independently represent a hydrogen atom, a halogen atom, an alkyl group, an aralkyl group, an aryl group, a substituted silyl group, an alkoxy group, an aralkyloxy group, an aryloxy group or a di-substituted amino group; and R$^1$, R$^2$, R$^3$, R$^4$, R$^5$ and R$^6$ may be optionally combined with each other to form a ring);

(B): at least one aluminum compound selected from the following (B1) to (B3);
(B1) an organoaluminum compound represented by the general formula E$^1_a$AlZ$_{3-a}$,
(B2) a cyclic aluminoxane having a structure represented by the general formula {—Al(E$^2$)—O—}$_b$, and
(B3) a linear aluminoxane having a structure represented by the general formula E$^3${—Al(E$^3$)—O—}$_c$AlE$^3_2$
(wherein E$^1$, E$^2$ and E$^3$ respectively represents a hydrocarbon group, all of E$^1$, E$^2$ and E$^3$ may be the same or different; Z represents a hydrogen atom or a halogen atom, and all of Z may be the same or different; a represents a numeral of 0 to 3; b represents an integer of not less than 2; and c represents an integer of not less than 1); and (C): a boron compound of any one of the following (C1) to (C3);
(C1) a boron compound represented by the general formula BQ$^1$Q$^2$Q$^3$,
(C2) a boron compound represented by the general formula G$^+$(BQ$^1$Q$^2$Q$^3$Q$^4$)$^-$, and
(C3) a boron compound represented by the general formula (L—H)$^+$(BQ$^1$Q$^2$Q$^3$Q$^4$)$^-$
(wherein B represents a boron atom in the trivalent valence state; Q$^1$ to Q$^4$ may be the same or different and represent a halogen atom, a hydrocarbon group, a halogenated hydrocarbon group, a substituted silyl group, an alkoxy group or a di-substituted amino group; G$^+$ represents an inorganic or organic cation; L represents a neutral Lewis base; and (L—H)$^+$ represents a Brφnsted acid).

The producing process is explained in more detail below.

(A) Transition Metal Complex

In the general formula [I], the transition metal atom represented by $M^1$ means a transition metal element of Group IV of the Periodic Table of the Elements (IUPAC Inorganic Chemistry Nomenclature, Revised Edition, 1989), and examples thereof include a titanium atom, zirconium atom, hafnium atom, etc. Among them, titanium atom or zirconium atom is preferred.

Examples of an atom of the XVI Group indicated as A in the general formula [I], include an oxygen atom, sulfur atom, selenium atom and the like. Among them, an oxygen atom is preferred.

Examples of an atom of the XIV Group indicated as J in the general formula [I], include a carbon atom, silicon atom, germanium atom and the like, a carbon atom and silicon atom are preferred, and a carbon atom is particularly preferred as J.

The group having a cyclopentadiene anion skeleton, as for the substituent $Cp^1$, includes $\eta^5$-(substituted) cyclopentadienyl group, $\eta^5$-(substituted)indenyl group, $\eta^5$-(substituted)fluorenyl group, etc. Specific examples thereof include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, an $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group are particularly preferred.

Examples of the halogen atom in the substituent $X^1$, $X^2$, $R^1$, $R^2$, $R^3$, $R^4$, $R^5$ or $R^6$ include a fluorine atom, chlorine atom, bromine atom, iodine atom and the like, preferably a chlorine atom or bromine atom, more preferably a chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include methyl group, ethyl group, n-propyl group, isopropyl group, n-butyl group, sec-butyl group, tert-butyl group, n-pentyl group, neopentyl group, sec-amyl group, n-hexyl group, n-octyl group, n-decyl group, n-dodecyl group, n-pentadecyl group, n-eicosyl group, etc., more preferably a methyl group, ethyl group, isopropyl group, tert-butyl group or sec-amyl group.

All of these alkyl groups may be substituted with a halogen atom (e.g. a fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as a methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (4,6-dimethylphenyl)methyl group, (2,3,4-timethylphenyl) methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl) methyl group, (ethylphenyl)methyl group, (n-propylphenyl) methyl group, (isopropylphenyl)methyl group, (n-butylphenyl)methyl group, (sec-butylphenyl)methyl group, (tert-butylphenyl)methyl group, (n-pentylphenyl)

methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., more preferably a benzyl group.

All of these aralkyl groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aryl group in the substituent $X^1$, $X^2$, $R^1$, $R^2$, $R^3$, $R^4$, $R^5$ or $R^6$, an aryl group having 6 to 20 carbon atoms is a preferred. Examples thereof include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably phenyl group. All of these aryl groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as a methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as a phenyl group. Examples of the substituted silyl group having 1 to 20 carbon atoms include mono-substituted silyl group having 1 to 20 carbon atoms, such as a methylsilyl group, ethylsilyl group, phenylsilyl group, etc.; di-substituted silyl group having 2 to 20 carbon atoms, such as a dimethylsilyl group, diethylsilyl group, diphenylsilyl group, etc.; and tri-substituted silyl group having 3 to 20 carbon atoms, such as a trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group or triphenylsilyl group.

All of the hydrocarbon groups of these substituted silyl groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably methoxy group, ethoxy group or tert-butoxy group.

All of these alkoxy groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include a benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl) methoxy group, (n-hexylphenyl)methoxy group, (n-octylphenyl)methoxy group, (n-decylphenyl)methoxy group, (n-tetradecylphenyl)methoxy group, naphthylmethoxy group, anthracenylmethoxy group, etc., more preferably a benzyloxy group.

All of these aralkyloxy groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (e.g. a fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include alkyl group having 1 to 10 carbon atoms, such as a methyl group, ethyl group, n-propyl group, isopropyl group, n-butyl group, sec-butyl group, tert-butyl group, isobutyl group, n-pentyl group, n-hexyl group, cyclohexyl group, etc.; aryl group having 6 to 10 carbon atoms, such as phenyl group, etc.; and aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group or diethylamino group. The substituent $R^1$, $R^2$, $R^3$, $R^4$, $R^5$ and $R^6$ may be optionally combined with each other to form a ring. $R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably a halogen atom.

Examples of the transition metal complex A include transition metal complexes wherein J is a carbon atom in the general formula [I], such as methylene(cyclopentadienyl)(3, 5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy) titanium dichloride, methylene(cyclopentadienyl)(3-tert-butyl-5-chloro-2-phenoxy)titanium dichloride, methylene (methylcyclopentadienyl)(3,5-dimethyl-2-phenoxy) titanium dichloride, methylene(methylcyclopentadienyl)(3-tert-butyl-2-phenoxy)titanium dichloride, methylene (methylcyclopentadienyl)(3-tert-butyl-5-methyl-2-phenoxy)titanium dichloride, methylene (methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tert-butylcyclopentadienyl) (3,5-dimethyl-2-phenoxy)titanium dichloride, methylene (tert-butylcyclopentadienyl)(3-tert-butyl-2-phenoxy) titanium dichloride, methylene(tert-butylcyclopentadienyl) (3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy) titanium dichloride, methylene(tert-butylcyclopentadienyl) (3-tert-butyl-5-chloro-2-phenoxy)titanium dichloride, methylene(tetramethylcyclopentadienyl)(3,5-dimethyl-2-phenoxy)titanium dichloride, methylene (tetramethylcyclopentadienyl)(3-tert-butyl-2-phenoxy) titanium dichloride, methylene (tetramethylcyclopentadienyl)(3-tert-butyl-5-methyl-2-phenoxy)titanium dichloride, methylene (tetramethylcyclopentadienyl)(3-phenyl-2-phenoxy) titanium dichloride, methylene (tetramethylcyclopentadienyl)(3-tert-butyldimethylsilyl-5-methyl-2-phenoxy)titanium dichloride, methylene (tetramethylcyclopentadienyl)(3-trimethylsilyl-5-methyl-2-phenoxy)titanium dichloride, methylene (tetramethylcyclopentadienyl)(3-tert-butyl-5-methoxy-2-phenoxy)titanium dichloride, methylene (tetramethylcyclopentadienyl)(3-tert-butyl-5-chloro-2-phenoxy)titanium dichloride, methylene (trimethylsilylcyclopentadienyl)(3,5-dimethyl-2-phenoxy) titanium dichloride, methylene (trimethylsilylcyclopentadienyl)(3-tert-butyl-2-phenoxy) titanium dichloride, methylene (trimethylsilylcyclopentadienyl)(3-tert-butyl-5-methyl-2-phenoxy)titanium dichloride, methylene (trimethylsilylcyclopentadienyl)(3-phenyl-2-phenoxy) titanium dichloride, methylene (trimethylsilylcyclopentadienyl)(3-tert-butyldimethylsilyl-5-methyl-2-phenoxy)titanium dichloride, methylene (trimethylsilylcyclopentadienyl)(3-trimethylsilyl-5-methyl-2-phenoxy)titanium dichloride, methylene (trimethylsilylcyclopentadienyl)(3-tert-butyl-5-methoxy-2-phenoxy)titanium dichloride, methylene (trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene (fluorenyl)(3-tert-butyl-2-phenoxy)titanium dichloride, methylene(fluorenyl)(3-tert-butyl-5-methyl-2-phenoxy) titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene (fluorenyl)(3-tert-butyl-5-chloro-2-phenoxy)titanium dichloride, isopropylidene(cyclopentadienyl)(3,5-dimethyl-2-phenoxy)titanium dichloride, isopropylidene (cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene (cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene (cyclopentadienyl)(3-tert-butyl-5-chloro-2-phenoxy) titanium dichloride, isopropylidene (methylcyclopentadienyl)(3,5-dimethyl-2-phenoxy) titanium dichloride, isopropylidene (methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene (methylcyclopentadienyl)(3-tert-butyldimethylsilyl-5-methyl-2-phenoxy)titanium dichloride, isopropylidene (methylcyclopentadienyl)(3-trimethylsilyl-5-methyl-2-phenoxy)titanium dichloride, isopropylidene (methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tertbutyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy) titanium dichloride, diphenylmethylene(fluorenyl)(3-tert-butyl-2-phenoxy)titanium dichloride, diphenylmethylene (fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl) (3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl) (3-tert-butyl-5-chloro-2-phenoxy)titanium dichloride, compounds wherein titanium of these compounds is replaced by zirconium or hafnium, compounds wherein dichloride of these compounds is replaced by dibromide, diiodide, bis (dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and transition metal complexes wherein J is an atom of Group XIV of the Periodic Table of the Elements other than carbon atom, such as dimethylsilylene (cyclopentadienyl)(2-phenoxy)titanium dichloride, dimethylsilylene(cyclopentadienyl)(3-methyl-2-phenoxy)titanium dichloride, dimethylsilylene (cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene (cyclopentadienyl)(3-tert-butyl-5-methyl-2-phenoxy) titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene (cyclopentadienyl)(3-tert-butyldimethylsilyl-5-methyl-2-phenoxy)titanium dichloride, dimethylsilylene (cyclopentadienyl)(5-methyl-3-trimethylsilyl-2-phenoxy) titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene (cyclopentadienyl)(3,5-di-sec-amyl-2-phenoxy)titanium dichloride, dimethylsilylene(methylcyclopentadienyl)(2-phenoxy)titanium dichloride, dimethylsilylene (methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene (methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene (methylcyclopentadienyl)(5-methyl-3-phenyl-2-phenoxy) titanium dichloride, dimethylsilylene (methylcyclopentadienyl)(3-tert-butyldimethylsilyl-5-methyl-2-phenoxy)titanium dichloride, dimethylsilylene (methylcyclopentadienyl)(5-methyl-3-trimethylsilyl-2-phenoxy)titanium dichloride, dimethylsilylene (methylcyclopentadienyl)(3-tert-butyl-5-methoxy-2-phenoxy)titanium dichloride, dimethylsilylene (methylcyclopentadienyl)(3-tert-butyl-5-chloro-2-phenoxy) titanium dichloride, dimethylsilylene (methylcyclopentadienyl)(3,5-di-sec-amyl-2-phenoxy) titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene (n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy) titanium dichloride, dimethylsilylene(n-butylcyclopentadienyl)(5-methyl-3-phenyl-2-phenoxy) titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy) titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-di-sec-amyl-2-phenoxy) titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene (tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy) titanium dichloride, dimethylsilylene(tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-di-sec-amyl-2-phenoxy) titanium dichloride, dimethylsilylene (tetramethylcyclopentadienyl)(2-phenoxy)titanium dichloride, dimethylsilylene(tetramethylcyclopentadienyl) (3-methyl-2-phenoxy)titanium dichloride, dimethylsilylene (tetramethylcyclopentadienyl)(3,5-dimethyl-2-phenoxy) titanium dichloride, dimethylsilylene (tetramethylcyclopentadienyl)(3-tert-butyl-2-phenoxy) titanium dichloride, dimethylsilylene (tetramethylcyclopentadienyl)(3-tert-butyl-5-methyl-2-phenoxy)titanium dichloride, dimethylsilylene (tetramethylcyclopentadienyl)(3,5-di-tert-butyl-2-phenoxy) titanium dichloride, dimethylsilylene (tetramethylcyclopentadienyl)(5-methyl-3-phenyl-2-phenoxy)titanium dichloride, dimethylsilylene (tetramethylcyclopentadienyl)(3-tert-butyldimethylsilyl-5-methyl-2-phenoxy)titanium dichloride, dimethylsilylene (tetramethylcyclopentadienyl)(5-methyl-3-trimethylsilyl-2-phenoxy)titanium dichloride, dimethylsilylene (tetramethylcyclopentadienyl)(3-tert-butyl-5-methoxy-2- phenoxy)titanium dichloride, dimethylsilylene (tetramethylcyclopentadienyl)(3-tert-butyl-5-chloro-2-phenoxy)titanium dichloride, dimethylsilylene (tetramethylcyclopentadienyl)(3,5-di-sec-amyl-2-phenoxy) titanium dichloride, dimethylsilylene (trimethylsilylcyclopentadienyl)(2-phenoxy)titanium dichloride, dimethylsilylene (trimethylsilylcyclopentadienyl)(3-methyl-2-phenoxy) titanium dichloride, dimethylsilylene (trimethylsilylcyclopentadienyl)(3,5-dimethyl-2-phenoxy) titanium dichloride, dimethylsilylene (trimethylsilylcyclopentadienyl)(3-tert-butyl-2-phenoxy) titanium dichloride, dimethylsilylene (trimethylsilylcyclopentadienyl)(3-tert-butyl-5-methyl-2-phenoxy)titanium dichloride, dimethylsilylene (trimethylsilylcyclopentadienyl)(3,5-di-tert-butyl-2-phenoxy)titanium dichloride, dimethylsilylene (trimethylsilylcyclopentadienyl)(5-methyl-3-phenyl-2-phenoxy)titanium dichloride, dimethylsilylene (trimethylsilylcyclopentadienyl)(3-tert-butyldimethylsilyl-5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-butyl-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-di-sec-amyl-2-phenoxy)titanium dichloride, dimethylsilylene(indenyl)(2-phenoxy)titanium dichloride, dimethylsilylene(indenyl)(3-methyl-2-phenoxy)titanium dichloride, dimethylsilylene (indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl) (3,5-di-tert-butyl-2-phenoxy)titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-di-sec-amyl-2-phenoxy) titanium dichloride, dimethylsilylene(fluorenyl)(2-phenoxy) titanium dichloride, dimethylsilylene(fluorenyl)(3-methyl-2-phenoxy)titanium dichloride, dimethylsilylene(fluorenyl) (3,5-dimethyl-2-phenoxy)titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy) titanium dichloride, dimethylsilylene(fluorenyl)(5-methyl-3-phenyl-2-phenoxy)titanium dichloride, dimethylsilylene (fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-di-sec-amyl-2-phenoxy) titanium dichloride, dimethylsilylene (tetramethylcyclopentadienyl)(1-naphthox-2-yl)titanium dichloride, compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) or (phenylindenyl), compounds wherein (2-phenoxy) of these compounds is replaced by (3-phenyl-2-phenoxy), (3-trimethylsilyl-2-phenoxy) or (3-tert-butyldimethylsilyl-2-phenoxy), compounds wherein dimethylsilylene of these compounds is replaced by diethylsilylene, diphenylsilylene or dimethoxysilylene, compounds wherein titanium of these compounds is replaced by zirconium or hafnium, and compound wherein dichloride of these compounds is replaced by dibromide, diiodide, bis(dimethylamide), bis(diethylamide), di-n-butoxide or diisopropoxide.

The transition metal complex represented by the above general formula [I] can be synthesized, for example, by a method disclosed in Japanese Patent Publication (Kokai) No.9-87313 or the like.

(B) Aluminum Compound

The aluminum compound (B) used in the present invention includes publicly known organoaluminum compounds, that is, at least one aluminum compound selected from (B1) to (B3) described below:

(B1) an organoaluminum compound represented by the general formula $E^1{}_a AlZ_{3-a}$;

(B2) a cyclic aluminoxane having a structure represented by the general formula $\{-Al(E^2)-O-\}_b$; and (B3) a linear aluminoxane having a structure represented by the general formula $E^3\{-Al(E^3)-O-\}_c AlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; a represents a number satisfying the expression $0 < a \leq 3$; b represents an integer of 2 or more and c represents an integer of 1 or more).

As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1{}_a AlZ_{3-a}$ include trialkylaluminums such as trimethylaluminum, triethylaluminum, tri-n-propylaluminum, triisopropylaluminum, triisobutylaluminum, tri-n-hexylaluminum, etc.; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride, etc.; alkylaluminum dichlorides such as methylaluminum dichloride, ethylaluminum dichloride, n-propylaluminum dichloride, isopropyl aluminum dichloride, isobutylaluminum dichloride, n-hexylaluminum dichloride, etc.; and dialkylaluminum hydrides such as dimethylaluminum hydride, diethylaluminum hydride, di-n-propylaluminum hydride, diisobutylaluminum hydride, di-n-hexylaluminum hydride, etc.

Among them, trialkylaluminum is preferred and triethylaluminum or triisobutylaluminum is more preferred.

Specific examples of $E^2$ and $E^3$ in (B2) a cyclic aluminoxane having a structure represented by the general formula $\{-Al(E^2)-O-\}_b$ and (B3) a linear aluminoxane having a structure represented by the general formula $E^3\{-Al(E^3)-O-\}_c AlE^3{}_2$ include alkyl group such as methyl group, ethyl group, n-propyl group, isopropyl group, n-butyl group, isobutyl group, n-pentyl group, neopentyl group, etc. b is an integer of 2 or more, c is an integer of 1 or more. Each of $E^2$ and $E^3$ is preferably a methyl group or isobutyl group. b is preferably from 2 to 40 and c is preferably from 1 to 40.

The above aluminoxane is prepared by various methods. The method is not specifically limited, and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron Compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L—H)^+(BQ^1Q^2Q^3Q^4)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms. More preferably, $Q^1$ to $Q^4$ are a fluorinated hydrocarbon group having 1 to 20 carbon atoms and containing at least one fluorine atom, and most preferably, $Q^1$ to $Q^4$ are a fluorinated aryl group having 6 to 20 carbon atoms and containing at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B represents a boron atom in the trivalent valence state; and $Q^1$ to $Q^4$ are the same as defined in $Q^1$ to $Q^3$. Specific examples of $G^+$ as an inorganic cation in the compound represented by the general formula $G^+(BQ^1Q^2Q^3Q^4)^-$ include a ferrocenium cation, alkyl-substituted ferrocenium cation, silver cation, etc. Examples of the $G^+$ as an organic cation include a triphenylmethyl cation. $G^+$ is preferably a carbenium cation, particularly a triphenylmethyl cation.

Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate, etc.

Specific combination of them include ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl)borate, etc., most preferably triphenylmethyltetrakis(pentafluorophenyl)borate.

In the boron compound (C3) represented by the formula $(L—H)^+(BQ^1Q^2Q^3Q^4)^-$, L represents a neutral Lewis base; $(L—H)^+$ represents a Brønsted acid; B represents a boron atom in the trivalent valence state; and $Q^1$ to $Q^4$ are the same as defined in $Q^1$ to $Q^3$.

Specific examples of $(L—H)^+$ as a Brønsted acid in the compound represented by the formula $(L—H)^+(BQ^1Q^2Q^3Q^4)^-$ include trialkyl-substituted ammoniums, N,N-dialkylaniliniums, dialkylammoniums, triarylphosphoniums, etc., and examples of $(BQ^1Q^2Q^3Q^4)^-$ include those as defined above.

Specific combination of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl)borate, N,N-dimethylaniliniumtetrakis(pentafluorophenyl)borate, N,N-diethylaniliniumtetrakis(pentafluorophenyl)borate, N,N-2,4,6-pentamethylaniliniumtetrakis(pentafluorophenyl)borate, N,N-dimethylaniliniumtetrakis(3,5-bistrifluoromethylphenyl)borate, diisopropylammoniumtetrakis(pentafluorophenyl)borate, dicyclohexylammoniumtetrakis(pentafluorophenyl)borate, triphenylphosphoniumtetrakis(pentafluorophenyl)borate, tri(methylphenyl)phosphoniumtetrakis(pentafluorophenyl)borate, tri(dimethylphenyl)phosphoniumtetrakis(pentafluorophenyl)borate, etc., most preferably tri(n-butyl)ammoniumtetrakis(pentafluorophenyl)borate or N,N-dimethylanilinumtetrakis(pentafluorophenyl)borate.

Polymerization

The copolymer of the present invention can be obtained by conducting polymerization properly selecting conditions described below.

In the present invention, a catalyst for olefin polymerization, prepared by using a transition metal complex (A), and [a compound (B) and/or a compound (C)]. In case of using a catalyst for olefin in polymerization, prepared by using two components (A) and (B), the above cyclic aluminoxane (B2) and/or linear aluminoxane (B3) are preferable as (B). Other preferable embodiment of the catalyst for olefin in polymerization includes a catalyst for olefin polymerization, prepared by using the above (A), (B) and (C). As (B), the above (B1) is easily used.

The respective components are desirably used so that the molar ratio of (B)/(A) is usually within the range from 0.1 to 10000, preferably 5 to 2000 and the molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for feeding the respective components in a polymerization reactor. The respective components are desirably used so that the concentration of (A) is usually from 0.01 to 500 $\mu$mol/g, preferably from 0.05 to 100 $\mu$mol/g, more preferably from 0.05 to 50 $\mu$mol/g; the concentration of (B) is usually from 0.01 to 10000 $\mu$mol/g, preferably from 0.1 to 5000 $\mu$mol/g, more preferably from 0.1 to 2000 $\mu$mol/g, in terms of Al atom; and the concentration of (C) is usually from 0.01 to 500 $\mu$mol/g, preferably from 0.05 to 200 $\mu$mol/g, more preferably from 0.05 to 100 $\mu$mol/g.

As the catalyst used in the present invention, an inorganic carrier such as $SiO_2$, $Al_2O_3$ or the like, and a particle-like carrier including an organic polymer carrier such as a polymer of an olefin such as ethylene, styrene or the like, etc. may be used in combination. The polymerization process has no restriction in particular, and an arbitrary process such as, for example, a batch-wise or continuous gas phase polymerization process, bulk polymerization process, solution polymerization process, or slurry polymerization process or the like can be used.

When a solvent is used, various kind of solvents under a condition of not deactivating a catalyst can be used, and examples of such solvent include a hydrocarbon such as benzene, toluene, pentane, hexane, heptane, cyclohexane and the like; and a halogenated hydrocarbon such as methylene dichloride, dichlorostyrene and the like.

The polymerization temperature is not specifically limited, and −100 to 250° C. is usually adopted and −50 to 200° C. is preferably adopted. Further, the polymerization pressure is not limited, but is carried out usually under a pressure of 100 kg/cm$^2$ or less and preferably 2 kg/cm$^2$ to 50 kg/cm$^2$. And, a chain transfer agent such as hydrogen or the like can be added in order to adjust the molecular weight of the polymer.

Further, the copolymer may be also used as a resin composition blended with another thermoplastic resin. When the resin composition is used, the composition preferably contains 5 to 99 wt % of the copolymer and 95 to 1 wt % of the other thermoplastic resin(the total amount is 100 wt %).

The other thermoplastic resin is not particularly limited, and specific examples thereof include styrene-based resins, butadiene-based resins, ethylene-based resins, propylene-based resins, methacrylic resins, ABS resins, polyphenylene ether-based resins, polycarbonate resins and the like, preferably styrene-based resins, ethylene-based resins, polyphenylene ether-based resins and polycarbonate resins, and preferably styrene-based resins [e.g. polystyrene, rubber-modified polystyrenes (so-called high impact polystyrene), styrene-butadiene block copolymer, styrene-isoprene block copolymer] in particular.

The copolymer or the resin composition described above can optionally contain known additives such as lubricants, anti-static agents, antioxidants, thermal stabilizers, UV-absorbers, flame retardants, anti-fungus, pigments, dyestuffs, anti-blocking agents, anti-clouding agents, anti-drop agents, fillers(e.g. talc, mica, bariumsulfate, calcium carbonate, alumina-silicate), and plasticizers (e.g. mineral oils), and the like.

The shrink film of the present invention is used as a label for a glass container, a PET bottle or the like or an overlap wrapping film for a tray or the like, and prepared by stretching to at least one direction a film or sheet obtained according to a conventional method. Specifically, the shrink film is prepared by stretching uni-axially or bi-axially a film or sheet obtained by using a T-die extruder molding machine, with a tenter, a tubular stretching machine or the like.

As a shrink wrapping method, a well-know method can be applied.

Usually, in wrapping of a label on a PET bottle or the like, the shrink wrapping is carried out by passing the bottle wearing a tubular label through a heating furnace kept a temperature of 120 to 140° C.

The shrink film of the present invention can be also used in a form of a multi-layer film or sheet of two layers or more with other materials. Thereat, the film or sheet can be produced by known various kinds of lamination processes such as a co-extrusion process, a dry-lamination process, a sandwich-lamination process, an extrusion-lamination process and the like, etc. As other materials, known materials such as a cellophane, Nylon, polyethylene terephthalate (PET), polypropylene, an ethylene-vinylalcohol copolymer (EVOH), various adhesives and the like, can be used.

The shrink film of the present invention can be subjected to a publicly known post-treatment such as a corona discharge treatment, a plasma treatment, an ozone treatment, an ultra-violet rays irradiation, an electron beam irradiation or the like.

EXAMPLE

The present invention is further illustrated in detail according to Examples and Comparative Examples below, but the scope of the present invention is not restricted by such Examples. Further, physical properties of polymers in Examples were measured according to methods described below.

(1) The intrinsic viscosity ($[\eta]$) was measured at 135° C. using tetralin as a solvent with an Ubbelohde viscometer.

(2) The glass transition point was measured under conditions below with a DSC (SSC-5200 manufacture by Seiko Electronics Co., Ltd.) and determined by its inflection point.

Heating: 20° C. to 200° C. (20° C./min.),
retention for 10 minutes
Cooling: 200° C. to −50° C. (20° C./min.),
retention for 10 minutes
Measurement: −50° C. to 300° C. (20° C./min.)

(3) The molecular weight and molecular weight distribution were determined under conditions below with a Gel Permeation Chromatograph (800 series manufacture by Nippon Bunko Co., Ltd.). The molecular weight was evaluated by a ratio (weight average molecular weight/number average molecular weight) of weight average molecular weight to number average molecular weight.

Column: Shodex A806M
Measurement temperature: 45° C.,
Measurement solvent: Tetrahydrofuran
Measurement concentration: 0.5 mg/ml (4) The content of styrene in a copolymer (mol % of styrene contained in monomers constituting the copolymer) and the structure of the polymer such as a sequence of monomers were determined according to $^{13}$C-NMR analysis (JNM-EX270 manufactured by JEOL LTD).

Measurement solvent: Ortho-dichlorobenzene
Measurement temperature: 135° C.

(5) The solid viscoelasticity of a polymer was determined under conditions below with a spectrometer(a tension module, DMS200 was connected to a measurement and analysis apparatus, Rheostation SDM5600H manufactured by Seiko Denshi industries, Ltd.)

Test piece: A pressed sheet of 20 mm×0.3 mm×0.3 mm
Frequency: 5 Hz
Heating rate: 2° C./minute
Displacement of vibration amplitude: 10 μm

(6) The Thermal Shrinkage Ratio

A circle stretched film having a diameter of 65 mm was heated in a silicon oil bath for 5 second, and the difference of the diameter(average value of the major axis and the minor axis) between before the heating and after the heating of the film. The shrinkage ratio was calculated according to the following equation.

$$\text{Shrinkage ratio}(\%) = 100 \times [(\text{diameter before shrinking}) - (\text{diameter after shrinking})]/(\text{diameter before shrinking})$$

Example 1

After previously charging 40 ml of styrene and 3 ml of dry toluene into a 400 ml autoclave which had been replaced with argon, ethylene was charged under a pressure of 0.4 Mpa. After 4.0 ml of toluene solution of triisobutylaluminum [manufactured by Toso-Akzo Co., Ltd., 1 mol/l] and a solution obtained by dissolving 6.0 mg of isopropylidene (cyclopentadienyl)(3-tert-butyl-5-methyl-2-phenoxy) titanium dichloride in 8 ml of dry toluene were previously mixed, they were charged and successively, a solution obtained by dissolving 44.3 mg of triphenylmethyltetrakis (pentafluorophenyl) borate in 9.6 ml of dry toluene was added. The reaction liquid was stirred at 60° C. for 1 hour. Then, the reaction liquid was poured in a mixture of 5 ml of hydrogen chloride (12N) and 1000 ml of methanol, and a white solid precipitated was collected by filtration. The solid was rinsed with methanol and then dried under reduced pressure to obtain 32.30 g of a polymer. The catalyst activity based on 1 mole of the titanium compound was 2043 kg/mol-Ti. The [η] of the polymer was 1.08 dl/g, number average molecular weight was 116,000, molecular weight distribution (weight average molecular weight/number average molecular weight) was 2.50, glass transition point was 31° C., and the content of styrene in the copolymer was 49 mol %.

The ratio of the area of the peak appearing at 34.0 to 36.0 ppm in a $^{13}$C-NMR spectrum to the area of the peak appearing at 36.0 to 38.0 ppm was 0.19.

Figure 1:
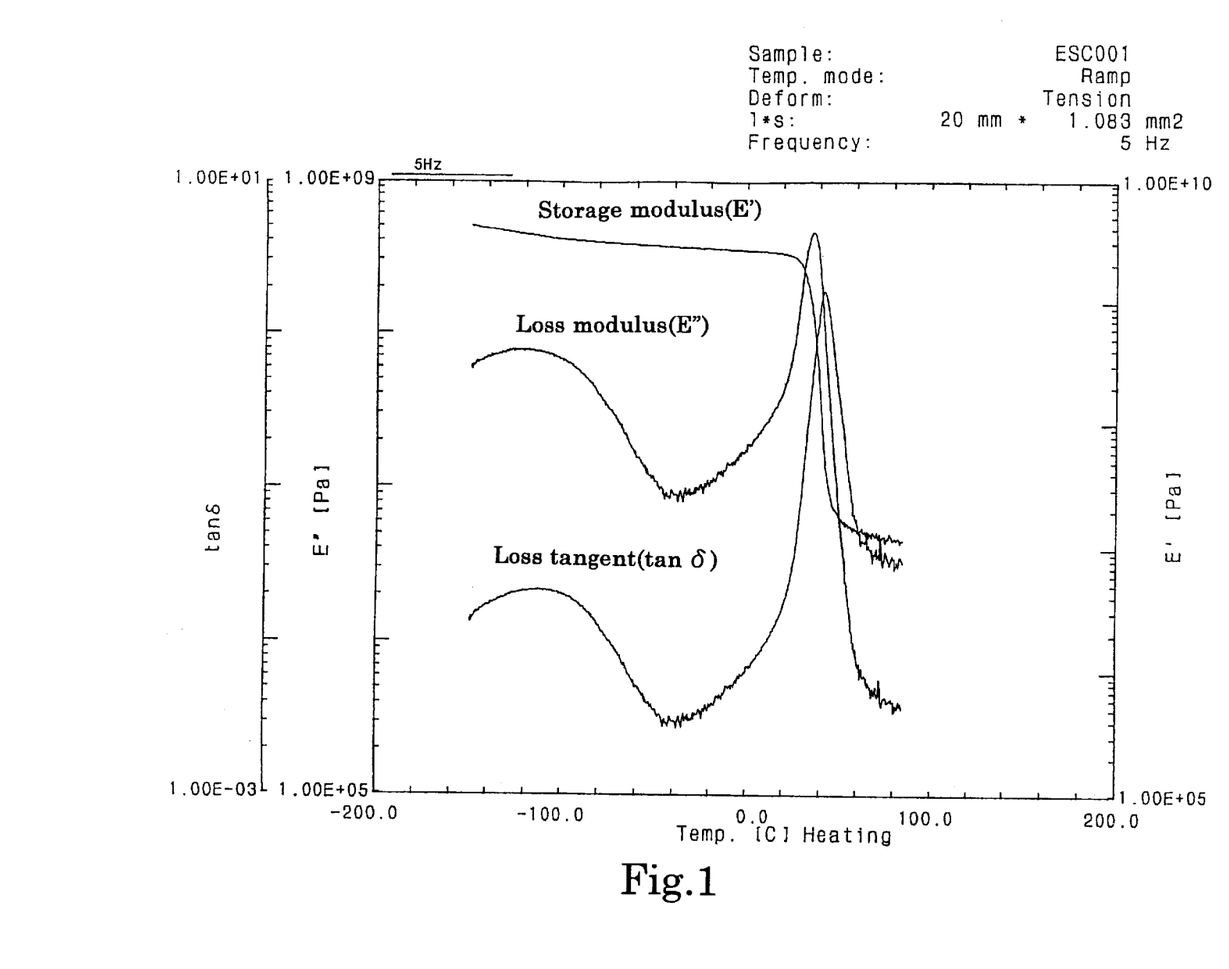
FIG. 1 shows a chart of a solid viscoelasticity of the copolymer obtained in Example 1.

The solid viscoelasticity of the copolymer is shown in FIG. 1. The storage modulus (E') rapidly decreased near the glass transition point.

Further, the press sheet prepared for the measurement had a very high transparency.

The press sheet of the copolymer having a thickness of about 0.6 mm was prepared by hot press molding at 150° C., cut to obtain a square sheet of 80 mm×80 mm in size as a sample, subjected to bi-axially stretching at stretched ratios of 3 times in vertical and 3 times in horizontal at the same time at a stretching temperature of 23° C. and stretching rate of 1.8 m/second after the sample fixed was sufficiently pre-heated at 73° C. with a desk bi-axial stretching machine to obtain a stretched film of about 65 μm in thickness. The stretching property was good. As results of measurement of the thermal shrinkage ratio. The thermal shrinkage ratio at 60° C. was 56%, that at 50° C. was 42%, and that at 40° C. was less than 2%. Because, in this measuring method of the thermal shrinkage ratio, the shrinkage ratio was 67% when the press sheet was perfectly recovered to the sheet before shrinking, it was found that the copolymer showed considerably high shrinkage ratio at low temperature as 60° C. Therefore, it is considered that the thermal shrinkage ratio at 80° C. is more high.

Comparative Example 1

The thermal shrinkage ratio of a Styrene-butadiene block copolymer (manufactured by Phillips Co., Ltd., K-RESIN KR-01) was measured. As results, the thermal shrinkage ratio at 100° C. was 39%, those at 90° C. and 80° C. were 22% and 5%, respectively, and that at 40° C. was less than 2%.

As illustrated in detail above, according to the present invention, a shrink film of a non-chlorine resin, having a transparency, a low temperature shrinking property, a high shrinkage ratio and a small natural shrinkage can be provided and its industrial value is markedly great.

What is claimed is:

1. A shrink film comprising a non-crystalline copolymer of ethylene with an alkenyl aromatic hydrocabon, wherein the copolymer has a structure in which carbon atoms substituted with an aromatic hydrocarbon group mutually separated by one methylene group, a structure in which carbon atoms substituted with an aromatic hydrocarbon group mutually separated by two methylene groups, and s structure in which carbon atoms substituted with an aromatic hydrocarbon group mutually separated by three or more methylene groups.

2. The shrink film according to claim 1, wherein the alkenyl aromatic hydrocarbon is a member selected from the group consisting of styrene, p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, p-sec-butylstyrene and 1-vinylnaphthalene.

3. The shrink film according to claim 1, wherein the alkenyl aromatic hydrocarbon is styrene.

4. The shrink film according to claim 1, wherein a ration of an area of a peak ② appearing at 34.0 to 36.0 ppm in a $^{13}$C-NMR spectrum of said copolymer to an area of a peak ③ appearing at 36.0 to 38.0 ppm is 0.01 to 0.25.

5. The shrink film according to claim 4, wherein the ratio is 0.01 to 0.20.

6. The shrink film according to claim 1, wherein the copolymer has a glass transition point of 25 to 100° C.

7. The shrink film according to claim 6, wherein the copolymer has a glass transition point of 30 to 80° C.

8. The shrink film according to claim 1, wherein the copolymer is a copolymer obtained by copolymerizing ethylene with the alkenyl aromatic hydrocarbon in the presence of a catalyst prepared by using (A) and (B), (A) and (C), or (A), (B) and (C) described below:

(A) a transition metal complex represented by the following general formula [I]:

[I]

(wherein $M^1$ indicates a transition metal atom of the Group IV of the Periodic Table of the Elements; A indicates an atom of the Group XVI of the Periodic Table of the Elements; J indicates an atom of the Group XIV of the Periodic Table of the Elements;

$Cp^1$ indicates a group having a cyclopentadiene type anion skeleton; each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group; and $R^1$, $R^2$, $R^3$, $R^4$, $R^5$ and $R^6$ may be optionally combined with each other to form a ring);

(B) one or more aluminum compounds selected from the following (B1) to (B3);

(B1) an organoaluminum compound represented by the general formula $E^1{}_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; "a" represents a number satisfying the expression $0<a\leq 3$; "b" represents an integer of 2 or more and "c" represents an integer of 1 or more); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and respectively represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^+$ represents a Brƒnsted acid).

* * * * *